United States Patent
Gur et al.

(10) Patent No.: US 10,169,647 B2
(45) Date of Patent: Jan. 1, 2019

(54) INFERRING BODY POSITION IN A SCAN (71) Applicant: International Business Machines Corporation, Armonk, NY (US)

(72) Inventors: Yaniv Gur, San Jose, CA (US); Mehdi Moradi, San Jose, CA (US); Tanveer F. Syeda-Mahmood, Cupertino, CA (US); Hongzhi Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 15/220,932

(22) Filed: Jul. 27, 2016

(65) Prior Publication Data
US 2018/0032801 A1 Feb. 1, 2018

(51) Int. Cl.
*G06K 9/00* (2006.01)
*G06K 9/62* (2006.01)
*G06K 9/46* (2006.01)

(52) U.S. Cl.
CPC ....... *G06K 9/00362* (2013.01); *G06K 9/4614* (2013.01); *G06K 9/4647* (2013.01); *G06K 9/4652* (2013.01); *G06K 9/6269* (2013.01); *G06K 2209/05* (2013.01)

(58) Field of Classification Search
None
See application file for complete search history.

(56) References Cited

U.S. PATENT DOCUMENTS

| | | | |
|---|---|---|---|
| 6,161,130 A * | 12/2000 | Horvitz | G06F 17/30707 707/999.005 |
| 6,631,204 B1 | 10/2003 | Smith | |
| 6,873,676 B2 | 3/2005 | Hsieh | |

(Continued)

OTHER PUBLICATIONS

Girshick, R., Donahue, J., Darrell, T., & Malik, J. (2014). Rich feature hierarchies for accurate object detection and semantic segmentation. In Proceedings of the IEEE conference on computer vision and pattern recognition (pp. 580-587).*

(Continued)

*Primary Examiner* — Vu Le
*Assistant Examiner* — Samah A Beg
(74) *Attorney, Agent, or Firm* — Schmeiser, Olsen & Watts, LLP; Dan Johnson (57) ABSTRACT

A method and system for automatically inferring a subject's body position in a two-dimensional image produced by a medical-imaging system are disclosed. The image is labeled with a body position selected from a semantically meaningful set of candidate positions sequenced in order of their relative locations in a subject's body. A processor performs procedures that each identify a class of image features related to pixel intensity, such as a histogram of gradients, local binary patterns, or Haar-like features. A second set of procedures employs applications of a pretrained convolutional neural network that has learned to recognize features of a specific class of medical images. The results of both types of procedures are then mapped by a pretrained support-vector machine onto candidate image labels, which are mathematically combined into a single, semantically meaningful, label most likely to identify a body position of the subject shown by the image.

20 Claims, 4 Drawing Sheets

(56) References Cited

U.S. PATENT DOCUMENTS

| | | | | |
|---|---|---|---|---|
| 7,227,893 | B1* | 6/2007 | Srinivasa | G06K 9/00771 348/155 |
| 8,194,959 | B2 | 6/2012 | Sakaida | |
| 8,331,637 | B2 | 12/2012 | Bar-Aviv et al. | |
| 8,407,267 | B2 | 3/2013 | Feulner et al. | |
| 9,460,613 | B1* | 10/2016 | Whiting | G08G 1/005 |
| 9,607,402 | B1* | 3/2017 | Whiting | G08G 1/166 |
| 9,639,777 | B1* | 5/2017 | Moloney | G06K 9/00288 |
| 9,928,448 | B1* | 3/2018 | Merler | G06K 9/66 |
| 2005/0091674 | A1* | 4/2005 | Knight | G06F 9/4488 719/332 |
| 2005/0165824 | A1* | 7/2005 | Farnham | G06F 17/3061 |
| 2010/0086215 | A1* | 4/2010 | Bartlett | G06K 9/00335 382/197 |
| 2010/0205124 | A1* | 8/2010 | Ben-Hur | G06K 9/6215 706/12 |
| 2013/0136322 | A1* | 5/2013 | Zhan | G06T 7/73 382/128 |
| 2013/0251206 | A1* | 9/2013 | Ishikawa | G06K 9/00624 382/103 |
| 2013/0259310 | A1* | 10/2013 | Tsukamoto | G06K 9/00362 382/103 |
| 2014/0003699 | A1 | 1/2014 | Moulik | |
| 2014/0169663 | A1* | 6/2014 | Han | G06K 9/00724 382/159 |
| 2015/0112182 | A1 | 4/2015 | Sharma et al. | |
| 2015/0117773 | A1* | 4/2015 | Kamiya | G06K 9/00362 382/165 |
| 2016/0055237 | A1* | 2/2016 | Tuzel | G06F 17/30707 382/224 |
| 2016/0253466 | A1* | 9/2016 | Againan | G06N 3/0427 382/128 |
| 2016/0358337 | A1* | 12/2016 | Dai | G06T 5/10 |
| 2017/0053398 | A1* | 2/2017 | Mahoor | G06T 7/0012 |
| 2017/0076454 | A1* | 3/2017 | Yano | H04N 13/366 |
| 2017/0109612 | A1* | 4/2017 | Mittal | G06K 9/00791 |
| 2017/0372155 | A1* | 12/2017 | Odry | G06K 9/03 |

OTHER PUBLICATIONS

Niu, X. X., & Suen, C. Y. (2012). A novel hybrid CNN-SVM classifier for recognizing handwritten digits. Pattern Recognition, 45(4), 1318-1325.*

Deng et al., ImageNet: A Large-Scale Hierarchical Image Database, 978-1-4244-3991-1/09/$25.00 © 2009 IEEE, pp. 248-255.

Lienhart et al., An Extended Set of Haar-like Features for Rapid Object Detection, 0-7803-7622-6/02, copyright, 2002 IEEE, pp. I-900-I903.

Ojala et al., A Comparative Study of Texture Measures with Classification Based on Feature Distributions, Pattern Recognition, vol. 29, No. 1, pp. 51-59, 1996.

Moradi et al., Viewpoint Recognition in Cardiac CT Images, IBM, H. van Assen et al. (Eds.): FIMH 2015, LNCS 9126, pp. 180-188, 2015, DOI:10.1007/978-3-319-20309-6_21.

Park et al., Automatic Cardiac View Classification of Echocardiogram, 978-1-4244-1631-8/07, copyright 2007, IEEE, 8 pages.

Codella et al., Automated Medical Image Modality Recognition by Fusion of Visual and Text Information, IBM, P. Golland et al., (Eds.): MICCAI 2014, Part II, LNCS 8674, pp. 487-495, 2014.

Chatfield, et al., Return of the Devil in the Details: Delving Deep into Convolutional Nets, arXiv:1405.3531v4, [cs. CV] Nov. 5, 2014, 11 pages.

Yan et al., Bodypart Recognition Using Multi-stage Deep Learning, copyright Springer International Publishing, Switzerland 2015, S. Ourselin et al. (Eds.): IPMI 2015, LNCS 9123, pp. 449-461, 2015, DOI:10.1007/978-3-319-19992-4_35.

Viola et al., Rapid Object Detection using a Boosted Cascade of Simple Features, 0-7695-1272-0/01 $10.00 0 2001 IEEE, pp. I511-I518.

* cited by examiner

INFERRING BODY POSITION IN A SCAN

TECHNICAL FIELD

The present invention relates to automatically detecting anatomical structures and a body position represented by a two-dimensional image of a body scan, such as a computerized-tomography (CT) scan.

BACKGROUND

Medical-imaging systems produce two-dimensional or three-dimensional images of anatomical structures. Some imaging technologies, such as computer tomography, comprise a sequence of two-dimensional cross-section images, or "slices," viewed from progressive positions along an axis of a subject's body, that are then combined in sequential order to create a three-dimensional representation of the subject's anatomy.

One potential benefit of digital imaging technology is that it enables downstream computerized imaging systems and image-processing applications to organize, retrieve, analyze, or otherwise process scanned images. But because a 3D scan may extend across an extended region of a subject's body, each 2D cross-section may present the subject's anatomy from a different body position, and thus show different anatomical structures. CT and other imaging technologies thus generally require a way to identify a body position of a 2D or 3D image in order to identify anatomical structures shown in that image and then label the image accordingly.

A medical image may today be labeled by manually comparing the image to "atlas models," which are known, labeled reference images that are cataloged in an "atlas." But atlas modeling can be cumbersome and performing such a method without direct human intervention generally requires sophisticated and specialized application software and other imaging resources.

There exists no way to automatically associate a semantic label to an image produced by a medical-imaging system such that the label would allow downstream systems and applications to interpret a subject's body position and anatomical structures shown in the image. There is thus a need for a technical solution to this technical problem, which is necessarily rooted in medical-imaging technology.

BRIEF SUMMARY

A first embodiment of the present invention provides a method for inferring a subject's body position in a medical-imaging scan. An image-identification system receives a two-dimensional digital image generated by a computerized-tomography medical-imaging device that represents a cross-sectional view of a subject's body at a position along an axis of the subject's body. The system performs procedures upon the digital image that each identify and represent a set of image characteristics as a vector. One set of vectors each represent characteristics of the image that may be derived from relationships among intensities of pixels of the image and a second set of vectors each represent characteristics of the image selected from output of an internal layer of a convolutional neural network that has been populated with a digital representation of the accessed image. Both sets of vectors are submitted to a pretrained support-vector machine that returns, for each submitted vector, a candidate image label that identifies a position of the subject's body along the axis. A single label is generated by mathematically combining the candidate labels. This single label identifies a likely position of the subject's body along the axis represented by the input image.

A second embodiment of the present invention provides a method for assigning a semantically meaningful label to a digital image. An image-identification system derives from the digital image a set of feature vectors that each comprises numeric representations of one or more characteristics of the image. The system submits the feature vectors to a support-vector machine that has been pretrained to associate each vector with a possible type of subject matter. The support-vector machine returns a set of candidate image labels that each indicates a type of subject matter associated with one of the vectors. The system then mathematically combines the received candidate labels into a single semantically meaningful label from which can be determined that the digital image depicts a certain type of subject matter.

A third embodiment of the present invention provides a method for inferring body position in a CT scan. An image-identification system accesses a two-dimensional digital image generated by a medical-imaging device that represents a cross-sectional view of a human torso viewed from a body position perpendicular to a major axis of the subject's body. The system derives six feature vectors from the image, each of which represents a set of characteristics of the image. A first feature vector represents a histogram of oriented gradients of the image. A second feature vector represents a set of local binary patterns of the image. A third feature vector represents a set of Haar-like features of the image. A fourth feature vector represents a first feature map derived from output of a first convolution layer of a convolutional neural network. A fifth feature vector represents a second feature map derived from output of a second convolution layer of the convolutional neural network. A sixth feature vector represents a third feature map derived from output of a first fully connected layer of the convolutional neural network. The six feature vectors are submitted to a pretrained support-vector machine, which returns a candidate image label for each submitted vector. The system then generates a single image label by using a linear equation to combine the six received candidate image labels.

DETAILED DESCRIPTION

Systems and methods embodied by the present invention automatically identify a body position shown in a CT scan, from which may be inferred locations of anatomical structures of a subject's body. Although embodiments and examples of this invention described in this document generally refer to scans of a human torso or chest, and more specifically to anatomical structures related to the field of cardiology, embodiments of this invention are not limited to such images. Concepts underlying the present invention may be straightforwardly applied to images generated by any medical-imaging or other scanning technology, including MRI, CAT, and PET scanning and to images of any anatomical structure of a human or animal subject.

In brief, certain embodiments of the present invention analyze a medical image multiple times, using a different method to perform each analysis. Each method produces an n-tuple, known as a "feature vector," that consists of an ordered sequence of numeric values, where each value identifies a characteristic, or "feature", of the image. In embodiments described in this document, a first subset of features may be computed as functions of relationships among intensities of pixels comprised by the image, such as a density histogram, or an identification of a pattern of intensities of adjacent pixels. Such classifier methods, as illustrated by certain embodiments and examples described in this document, may be known in the art as "handcrafted classifiers."

A second subset of these methods comprises learned methods of classification, each of which generates a feature vector that represents features or characteristics inferred or derived by processing the image with a specially trained convolutional neural network (or "CNN").

A convolutional neural network is a layered data structure in which each layer forwards output to a subsequent layer as sets of "feature maps." A feature map is a set of "features" of an input entity that is loaded into the CNN's initial, outermost layer. In normal operation, the CNN may be trained by submitting to it a large number of input entities, by observing the final output of the neural network's outermost layer produced in response to a submission of each entity, and by fine-tuning internal parameters of the network to produce output that is more accurate.

Here, accuracy is determined by implementation-specific considerations. In one example, a neural network may be intended to determine whether an input image depicts a human face. A sample image of a face would be loaded into the CNN's outermost layer, resulting in each subsequent layer feeding its following layer with one or more feature maps. These feature maps comprise numeric representations of increasingly abstract mathematical representations of image features, such as the direction of an edge. The output of the final layer may be interpreted as indicating a likelihood that the input image depicts a human face.

Such an exemplary CNN could be trained by repeatedly feeding it images that either depict or do not depict a human face and then comparing the accuracy of its output to values of feature maps determined by the CNN in response to loading a sample image. A feature of a feature map that correlates more closely with an accurate response would then be given greater weighting by fine-tuning the CNN data structure, thus "training" the CNN to more accurately perform its intended task. Similarly, a feature generated by a layer of the CNN that has less correlation with accurate identifications might be given lesser weighting or deleted from the CNN.

Each vector in the second group of feature vectors comprises numeric representations of features selected from the output of one of the pretrained CNN's internal layers. In a conventional CNN application, the CNN's internal layers would not normally be accessed by an extrinsic entity during a production run and the output of these internal layers would instead be used by the CNN solely as intermediate results that are not accessed by a user.

The two resulting sets of feature vectors are then fed into a pretrained support vector machine (SVM). This pretrained SVM is a specialized version of a known type of mathematical model, and uses known statistical or analytical techniques to associate each feature vector with a candidate image label. Each candidate label, which may be as simple as an integer value, attempts to identify a position of a subject's body represented by the scanned image. Because each method of computing a feature vector may consider a different set of features or may use different methods of identifying features of the image, the SVM may associate particular values of each feature with a greater or lesser likelihood that a scanned image represents a particular label and body position. A final, most likely, label of the scanned image is generated by mathematically combining the candidate labels through known computational techniques, such as by means of a linear equation for which coefficients had been previously derived by a pretraining procedure.

Steps of these methods and the systems that perform them are described in greater detail below.

Embodiments of the present invention may identify or label a CT scan, where the identification or label specifies a semantic classification of a body area or body position depicted in a CT scan. These classifications may each represent an area relevant to the study of a disease or anatomic structure. For example, a chest scan, as described by examples presented below, may represent any of nine body areas or body positions that may each be associated with a cardiovascular function. Other embodiments may comprise a different number of body areas or semantic levels of meaning that are deemed appropriate for a particular body region or imaging technology, by one skilled in the art or as a function of expert knowledge.

Such embodiments may sort these semantic classifications in an order that corresponds to an order of corresponding body positions. For example, an embodiment might comprise a set of nine semantic categories of cardiac CT images, each of which might be used by the embodiment to label an input CT scan. In this example, these semantic categories might each mark an anatomic location within a human chest along a major axis of the human chest. Moving in a superior-inferior direction, these nine categories might comprise: 1) thoracic inlet region, 2) lung apex, 3) origin of great vessels, 4) aortic arch, 5) ascending/descending aorta, 6) pulmonary trunk, 7) aortic valve/aortic root, 8) axial 4-chamber view, and 9) long axis 2-chamber view. In such embodiments, a CT scan that is deemed to depict one of these nine anatomic locations might be labeled by embodiments of the present invention by a corresponding integer value within the inclusive range of 1-9.

Because semantically relevant labels impart meaning to images they label, one advantage of semantically labeling a scanned image is that a semantic label may be used by downstream systems and applications to further analyze two-dimensional slices and three-dimensional scans of human anatomy depicted by or derived from those slices.

Some embodiments further assign semantic meaning to the order of these nine classifications. In such cases, the classifications are numbered or otherwise ordered in a sequence that corresponds to relative depths of corresponding body positions along an axis of the subject's body. In embodiments and examples described in this document, a set of candidate classifications may be represented as a monotonically increasing sequence of integer numbers, but other embodiments may not be limited to such numerical representations.

In the above example, such an embodiment might identify that an image depicts structures lying at a body position one-quarter of a distance between the subject's pulmonary trunk (level 6) and aortic valve (level 7). The embodiment might then classify or label the image as lying at a level of 6.25, indicating to an imaging specialist or downstream application that the image identifies structures visible at a depth partway between the "level 6" position of subject's pulmonary trunk and the "level 7" position of the subject's aortic valve.

Embodiments of the present invention further comprise a method of identifying a body position or body area of a CT scan as a function of both empirically determined (or "handcrafted") identifications of image features and inferential identifications derived from applications of a specially trained convolutional neural network (CNN).

In particular, certain embodiments of the present invention may analyze each two-dimensional image of a CT series by six independent methods (or "classifiers"), each of which attempts, by means of either empirical analysis or by an application of convolutional neural-network technology, to classify or label an image by identifying "features" or groups of features, such as anatomical structures or a body position. All six methods guess at a semantic category of the image as a function of the visual appearance of the scan or of the physical or positional relationship of the scan to other CT scans in the same series.

Other aspects may comprise one or more different methods or classifiers, a subset of the six classifiers described in examples herein, or a total number of classifiers that is greater than or less than six. All embodiments, will, however, include at least one classifier that comprises empirical or "handcrafted" computations or source data, and at least one classifier that comprises computations or source data derived from a deep feature of a convolutional neural network.

Embodiments of the present invention may label an image with a semantic classification selected from a set of candidate classifications that are ordered in a sequence corresponding to their relative locations in a subject's body. If, for example, an embodiment comprises nine semantic classifications that each correspond to anatomic structures located at nine successively deeper layers of the human chest along an axis of the body along which the medical-imaging device scans the body, those categories might be numbered or sequenced as a function of a respective depth of each layer. Furthermore, if such an embodiment determines that an image represents a body location positioned between two such depths, the embodiment might select a semantic category that corresponds to a depth closest to the image's determined depth.

Embodiments of the present invention then aggregate or otherwise combine these six candidate identifications in order to identify a most likely true identification. This step may be performed by use of a customized support vector machine (SVM) or by use of a specially optimized linear-regression analysis. Other embodiments may comprise different methods of selecting a candidate identification or use different mechanisms to aggregate or otherwise combine the candidate identifications. But all embodiments will comprise a same general approach of refining and aggregating independent identifications produced by both empirical and inferential methods. An advantage of preferred methods herein is their use of a pretrained convolutional neural-network, machine-learning, or other artificially intelligent application to identify features of an image, rather than to self-learn how to identify such features as a function of real-world input.

Figure 1:
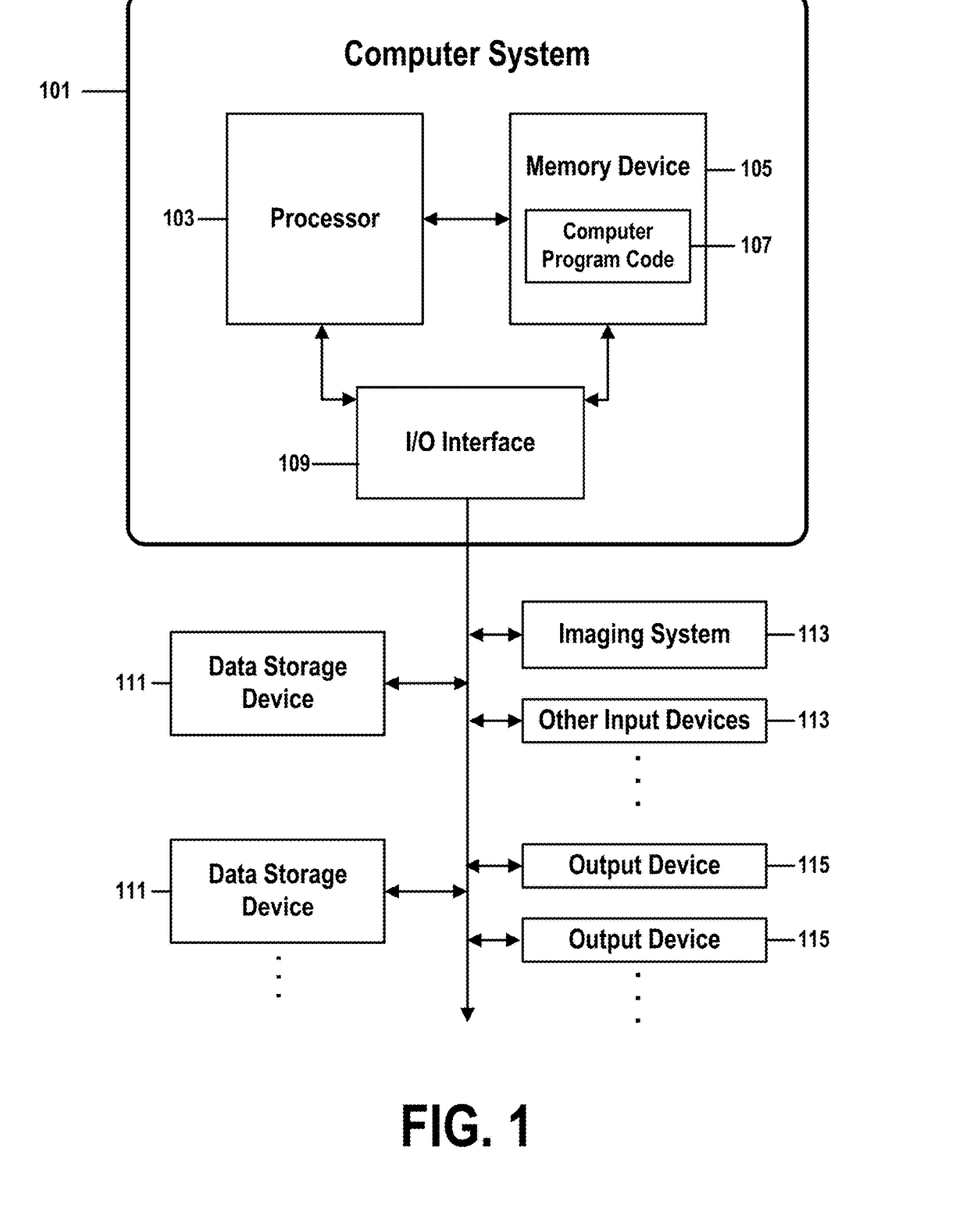
FIG. 1 shows the structure of a computer system and computer program code that may be used to implement a preferred method for inferring body position in a CT scan, in accordance with the present invention.

FIG. 1 shows the structure of a computer system and computer program code that may be used to implement a preferred method for inferring body position in a CT scan, in accordance with the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Embodiments of the present invention may comprise a specialized type of input devices 113 configured to allow the system 101 to receive medical-imaging scans, such as an image scanner, a specialized interface to a CT, CAT, PET, MRI, or other type of imaging device, an interface to an image database, or another type of input device or interface that allows the input device or interface to access a series of scans or individual two-dimensional scanned images. In some embodiments, this interface may be optimized to allow the embodiment to receive, access, or process an incoming image in real time, or quickly enough to facilitate an interactive user interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for inferring body position in a CT scan in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for inferring body position in a CT scan.

Any of the components of the present invention could be created, integrated, hosted, maintained, deployed, managed, serviced, supported, etc. by a service provider who offers to facilitate a method for inferring body position in a CT scan. Thus the present invention discloses a process for deploying or integrating computing infrastructure, comprising integrating computer-readable code into the computer system 101, wherein the code in combination with the computer system 101 is capable of performing a method for inferring body position in a CT scan.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for automatically inferring body position in a CT scan may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for automatically inferring body position in a CT scan is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
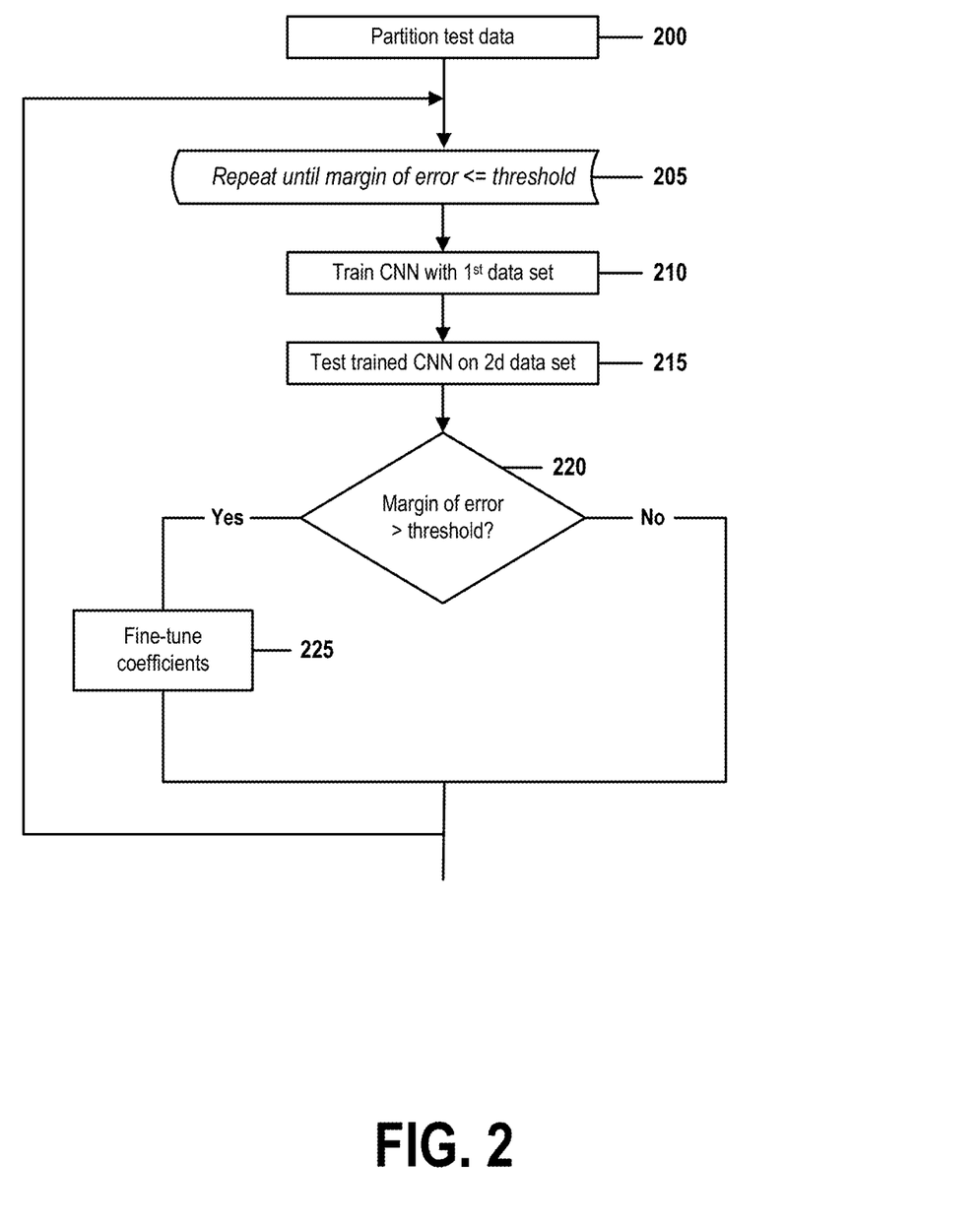
FIG. 2 shows a method of pretraining a convolutional neural network in accordance with preferred aspects of the present invention.

FIG. 2 shows a method of pretraining a convolutional neural network in accordance with preferred aspects of the present invention. FIG. 2 comprises steps 200-225.

Certain aspects of the method of FIG. 2 are adapted from known methods of training a convoluted neural network ("CNN") by feeding the network a large number of training images, documents, or other input, allowing the network to produce an inferred output in response to each input, identifying to the CNN certain types of errors in an output, and allowing the network to self-learn from its errors. At the conclusion of such a training method, the CNN should be able to produce correct output from similar input within an acceptable confidence factor. See. e.g., K. Chatfield, K. Simonyan, A. Vedaldi, and A. Zisserman, "Return of the devil in the details: Delving deep into convolutional nets," § 3.2, in British Machine Vision Conference, 2014.

Embodiments of the present invention adapt elements of the general method of Chatfield and others as a method of pretraining a convolutional neural network. Such a pretrained network would comprise deep features that may be adapted in order to label a CT image. This procedure, as will be described below, comprises feeding a large number of images to the network, allowing internal components (or "layers") of the network, acting as distinct classification mechanisms (or "classifiers"), to each indirectly suggest a candidate label for an input image. These indirect suggestions may take the form of an identification of certain groups of features or graphical patterns of an input image formatted as an n-tuple "feature vector." These inferred identifications are then compared to those that would be associated with a true, correct label or classification of the image. If the network fails to achieve a desired level of accuracy, the network is fine-tuned as a function of this failure and the pretraining continues with more input scans.

Unlike conventional applications of a neural network, the pretrained CNN does not self-learn how to identify image features when the CNN is used to classify input CT images. Instead, as described in FIG. 3, after using the method of FIG. 2 to pretrain the CNN, the present invention derives feature vectors from the output of three deep layers of the trained network. Each of these three vectors is then used to guess at a correct label of the input image as a function of characteristics of the image identified by one of the three network layers.

Figure 3:
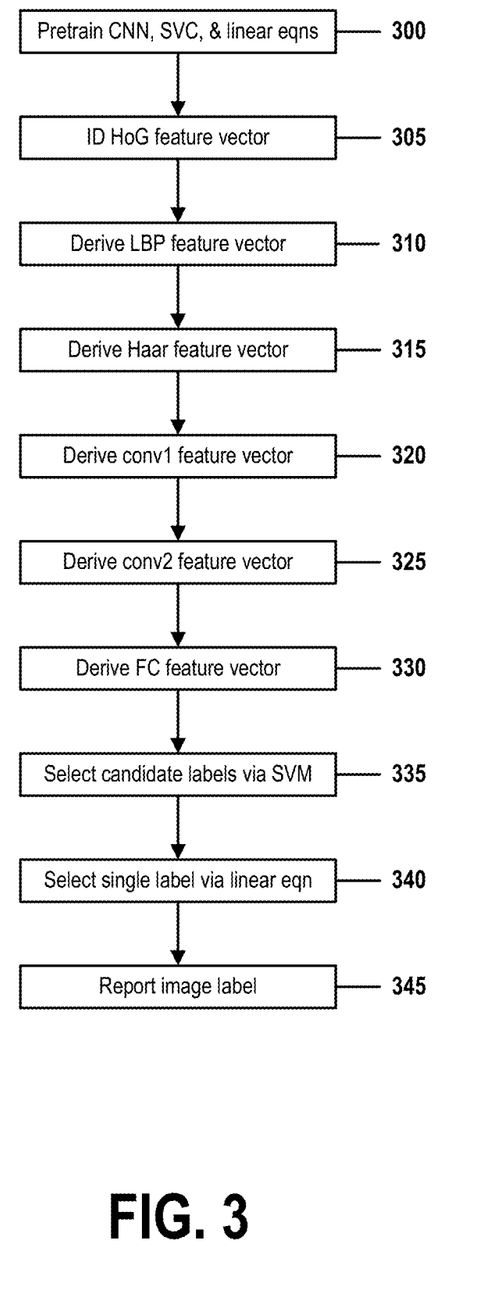
FIG. 3 is a flow chart that illustrates steps of a method for inferring body position in a CT scan in accordance with preferred aspects of the present invention.

Unlike conventional neural-network applications, other layers of the CNN are ignored and subsequent aggregation steps, distinct from any operation of the CNN itself, combine the three identifications, along with additional identifications inferred by other means, into a single label that is most likely to be a true, correct classification of the scan.

Some embodiments may further comprise, as is described in FIG. 3, analogous training methods for pretraining a support-vector machine of a method of FIG. 3, or to select or optimize coefficients of a linear equation of a linear-regression analysis of the method of FIG. 3.

In such cases, pretraining the SVM may comprise: seeding a computerized image-identification system that conforms to embodiments of the present invention with sets of training and test images selected by a step analogous to that of FIG. 2, step 200; submitting resulting sets of feature vectors to the SVM by a step analogous to that of FIG. 3, step 335; and then refining the SVM as a function of an accuracy of the SVM's resulting training output.

Similarly, selecting or optimizing coefficients of the linear equation may comprise then submitting the SVM's training output to a linear-regression analysis by a step analogous to that of FIG. 3, step 340, and then revising one or more coefficients of a linear equation comprised by the analysis as a function of an accuracy of a result of the analysis.

In step 200, one or more processors of a computerized image-identification system prepare a body of training data by splitting the body of data into two groups. One group will be used to train a convoluted neural network (CNN) and the other will be used to test the accuracy of the trained CNN.

The training data may comprise any sort of input of a type likely to be input to the network during real-world operation after completion of the method of FIG. 2. In one embodiment, this input comprises two-dimensional CT-scan images. In a narrower embodiment, the input comprises two-dimensional CT-scan images of a human chest or torso or of other regions of the human body relevant to the practice of cardiology.

In embodiments described in this document, the training data may comprise a larger number of training images, such as 500-600 images. Choice of an exact number of images, however, is implementation-dependent, and may be determined by a person with expert knowledge as a function of application goals, resource constraints, and a desired confidence level. A larger number of training images that train the CNN to produce more accurate results will also increase the amount of time and resources need to complete the training.

In some embodiments, the test data may also comprise a large number of test images, but there may be fewer test images than there are training images. In one example, the body of training data may consist of about 600 CT scans of human torsos, 80% of which are used to train the CNN and 200% of which are used to test the accuracy of the trained CNN.

Other embodiments may comprise different proportions of training and test data and an implementer skilled in the field may select how to divide the entire body of input images as a function of resource, time, and cost constraints, a desired level of accuracy, and other implementation-dependent details.

Step 205 begins an iterative procedure of steps 205-225, which is performed once for each performance of the CNN training procedure. This iterative procedure continues until the processor determines in step 220 that the CNN has been trained to produce results of a desired level of accuracy.

In step 210, the processor submits the training data selected in step 200 to the CNN. In one example, the CNN may in this step attempt to classify each two-dimensional image of a large body of CT chest scans by steps analogous to those described in FIG. 3, or by other steps specific to the training procedure being performed. In certain embodiments, this procedure may comprise providing the CNN with a correct label for each submitted image, allowing the CNN to infer patterns and other characteristics of the image related to the correct label. The exact training procedure may be selected by a person skilled in the art of neural-network design and implementation, as a function of resource constraints, characteristics of the input training data, or other implementation-dependent details.

In step 215, the processor submits the test data selected in step 200 to the CNN. The test-data labels inferred or otherwise identified by the CNN are then evaluated for accuracy.

In step 220, the processor determines whether an accuracy of the CNN's test output satisfies a threshold confidence factor. If the CNN's output exceeds a maximum allowable margin of error, the processor performs step 225 and then begins another iteration of the iterative procedure of steps 205-225. But if the CNN's output falls within an acceptable range, the CNN is deemed to have been sufficiently trained and the method of FIG. 2 ends.

In step 225, the processor attempts to increase the CNN's accuracy by fine-tuning a parameter of the CNN or of a computational operation that processes the output of the CNN. This fine-tuning may be performed by any means known in the art. Refining a convoluted neural network, for example, may be performed by algorithmic methods or by coefficient adjustments that would be known to a person skilled in the art of neural-network design, or may be performed automatically by a computer program.

Similarly, the processor may refine a post-CNN computational operation of FIG. 3, such as by fine-tuning coefficients of a linear equation used by a post-CNN step of FIG. 3, by any means known in the art of statistical analysis, linear algebra, linear-regression analysis, or other fields of mathematics. If, for example, the post-CNN operation comprises using a support-vector machine (or "SVM") to refine CNN output (as in FIG. 3, step 340), this fine-tuning may comprise training the support-vector machine to produce more accurate results by feeding the SVM feature vectors generated when steps analogous to those of FIG. 3 process the training images.

Similarly, if the post-CNN operation comprises using a linear-regression analysis to combine the SVM's candidate output labels into a single image label (as in FIG. 3, step 345), this fine-tuning may comprise adjusting coefficients or weightings of a set of linear equations to produce more accurate results when processing the SVM's training output.

At the conclusion of the method of FIG. 2, the CNN will have been fully trained and will be ready to perform steps of FIG. 3 in real-world applications of the present invention. There will be no need to further train the CNN or to require the CNN to perform any further self-learning operations.

FIG. 3 is a flow chart that illustrates steps of a method for inferring body position in a CT scan in accordance with preferred aspects of the present invention. FIG. 3 contains steps 300-345. Step 300 is described in greater detail in FIG. 2.

In step 300, a processor of a computerized image-identification system pretrains a convolutional neural network (CNN) by means of the method of FIG. 2. This computerized image-identification system may comprise an input device, such as a high-resolution transparency scanner, in order to input a digital copy of a previously generated two-dimensional hardcopy image; the computerized image-identification system may be configured to retrieve a previously scanned image stored as a digital file on a local or remote storage device, or the computerized image-identification system may comprise an interface that allows the system to receive scans directly from an imaging system.

In embodiments that comprise direct communications between the image-identification system and an imaging system, the direct communications may be configured so as to allow the analysis system to read scans in real time or to label each input image quickly enough to provide interactive response to an imaging technician.

The CNN may have been adapted, as a function of the pretraining of FIG. 2, to identify specific classes of patterns, structures, or other features comprised by a two-dimensional input image. In embodiments and examples described in this document, the CNN is pretrained to identify, locate, and classify anatomical structures represented by a two-dimensional slice of a CT scan of a human chest, in order to determine a body position from which the image's subject matter is viewed.

Embodiments of the present invention are not limited to these specific types of input, and the method of FIG. 3 may be straightforwardly adapted, by means known in the art, to similarly classify viewpoints and image features represented by other types of images or scans, or of images and scans of other regions of a human or animal body.

In some embodiments, the method of steps 305-345 may be repeated for every incoming image, determining and verifying a distinct label for each image. In such cases, the pretraining method of step 300 (and FIG. 2) may not be repeated. In other embodiments, the pretraining method may be repeated at certain times, or, in order to further train the CNN with additional training and test data, may be repeated if the processor determines that the CNN produces insufficiently accurate results.

In steps 305-330, the processor uses six distinct methods, or "classifiers," to identify groups of distinguishing features of an input image being processed. Each of these methods produces a vector that represents an identified feature group as an ordered n-tuple. This document will refer to these vectors as "feature vectors" because they represent groups of features of the input image.

Steps 305-315 employ three distinct "handcrafted" or "pixel-intensity" classification methods that generate feature vectors of the input image through direct analysis of intensities of pixels comprised by the input image. Each of these methods analyzes the input image's pixel intensities in different ways, thus producing vectors that represent different combinations of image features and that may produce conflicting results.

As described above, some embodiments may comprise a different number of pixel-intensity classifiers and pixel-intensity feature vectors.

One significant advantage of the present invention is the method of combining these three feature generators with three inferential feature generators derived from internal operations of the specialized neural network pretrained by the method of FIG. 2. As will be described in the final steps of the method of FIG. 3, this method of combination produces a single label that is more nuanced, considers a greater range of image parameters, and is more likely to be accurate than would a label produced by any of these component feature vectors taken alone, averaged, or otherwise combined by simpler known methods.

In step 305, the processor analyzes the input image in order to derive a group of features known as a "Histogram of Gradients" (or "HoG"). This HoG feature group is represented as a first pixel-intensity feature vector.

Methods of deriving a histogram of gradients of a two-dimensional image are known in the art. See. e.g., N. Dalal and B. Triggs, "Histograms of oriented gradients for human detection," in Conference on Computer Vision and Pattern Recognition 2005, in which an image is first cropped, generally by an automated method, to better isolate relevant features. Gradient filters are then applied in both horizontal and vertical directions, followed by binning operations and local grouping of image cells to normalize for variations in illumination and contrast. As with the other classification methods referenced in FIG. 3, details of this procedure are beyond the scope of this document, but have been clearly delineated in numerous references known in the art that enable a skilled person to implement this step.

For example, if analyzing a CT image scanned at a typical resolution, a person skilled in the art might calculate the image's HoG features as a function of nine gradient orientations, a cell size of 8, and a truncation parameter of 0.5. A resulting feature vector produced by such an embodiment might have a length (or dimension) of 576. These values, however, are merely examples and an implementation in which this first classifier has been pretrained by a specific selection of training input images may be found to produce more accurate results with a different set of parameters. In other cases, parameters may be selected as a function of characteristics of the expected input images (such as resolution) or as a function of hardware or software constraints. Selection of these parameters, and of similar parameters comprised by other pixel-intensity classifiers, may be determined by means known in the art.

In step 310, the processor next uses another known method to identify a group of local binary patterns" (or "LBPs") of the input image. An LBP pixel-intensity feature generator would then represent these LBP features as a second feature vector.

An LBP feature vector may be computed by methods known in the art and taught, for example, by Ojala, Pietikinen, and Harwood ("A comparative study of texture measures with classification based on featured distributions," Pattern Recognition, vol. 29, no. 1, pp. 51-59, 1996). LBP classifiers divide an image into cells and then compare a center pixel of each cell with neighboring pixels. A histogram is then built that represents how many times a center pixel of a particular cell is larger or smaller than its neighbors.

In the previous example, an LBP classifier may build histograms on different scales and combine them to produce a 256-dimensional feature vector. Enabling procedures to perform this step are described in numerous references.

In step 315, the processor uses a third classification method to generate a third pixel-intensity feature vector. This third vector represents an extended set of edge, line, and center-surround Haar-like features of the input image. Such methods are taught by references that enable a skilled person to implement this step, such as Lienhart and Maydt ("An extended set of haar-like features for rapid object detection," in IEEE Image Processing, 2002, pp. I900-I903), which builds upon the work of Viola and Jones ("Rapid object detection using a boosted cascade of simple features," in Conference on Computer Vision and Pattern Recognition 2001, pp. I511-I518).

In our running example, such Haar-like features might be calculated by applying specialized Haar-like filters to uniformly resized 100×100-pixel regions of the input image in order to produce a dense feature vector of size 11,808.

Steps 320-330 employ three inferential methods for generating three additional "learned" feature vectors of the input image, as functions of deep features of the convolutional neural network pretrained by the method of FIG. 2. These feature vectors are referred to here as being "learned" because they are produced by a CNN that, through the pretraining method of FIG. 2, has been fine-tuned (or has learned how) to produce output that most accurately labels the type of input images for which the system is intended.

A convolutional neural network comprises a set of self-learning filters, operators, or other computational functions that are organized into one or more "convolution layers." These layers may perform operations upon an input entity, such as an output of a previous layer or another mathematical representation of an input entity. Each of these convolution filters or operators may activate automatically when its comprising layer detects a specific type of feature at a particular spatial position in an input image, and each layer may produce output that is then further processed by a next convolution layer. In embodiments and examples described in this document, each layer of interest of the specialized, pretrained CNN produces a feature vector that represents, as an ordered tuple of numbers, a feature group of the input image.

A CNN may also contain one or more "fully connected" layers, which each summarize features generated by higher-level convolution layers. In embodiments described herein, for example, the pretrained network may comprise five convolution layers and two fully connected layers.

In most CNNs, the deepest or "outermost" layers (those that, by convention, are identified here by the highest layer numbers) produce feature vectors that contain less-detailed, or more abstract, representations of image features. In embodiments described here, for example, convolution layers 3, 4, and 5, would generate feature vectors that are smaller, lower-resolution, or sparser than those generated by convolution layers 1 and 2 or by a first fully connected layer that summarizes the output of layers 1 and 2. Embodiments of the present invention thus harvest feature vectors from only convolution layers 1 and 2 and fully connected layer 1.

Rather than using the CNN's self-learning ability to improve its accuracy by inferring semantic characteristics of input images (as in the pretraining phase of FIG. 2), this application of CNN technology instead in steps 320-330 harvests intermediate results produced by the CNN's internal layers. In other words, steps 320-330 repurpose components of the CNN as a set of de facto feature generators. The processor then uses a method of steps 335-340 to identify a body position represented by the input image by combining these intermediate results with the empirically determined feature vectors of steps 305-315.

In step 320, the processor allows the pretrained CNN to analyze the input image in order to produce a first learned feature vector. This analyzing may be performed automatically by the pretrained CNN data structure by loading a digital representation of the input image into the CNN's first layer. In response to this loading, the CNN's first internal convolutional layer will produce one or more feature maps, which are collections of features associated by the CNN with the image. These features may comprise numerical representations of any characteristics of the loaded digital image that were determined during the pretraining procedure to better correlate with accurate results. Furthermore, features that are found during the pretraining process to be more likely to assume certain values when certain known types of images are loaded into the CNN are more likely to be retained or to be more heavily weighted. By means of methods known in the art, the processor then straightforwardly packages the output features into a fourth, "conv1" learned feature vector similar in format to that of the first three feature vectors.

Selecting specific features of a feature map from what may be many maps produced by the first convolutional layer may thus be performed by means known in the art and, in some embodiments, this selection process may be performed entirely during a CNN pretraining procedure, in which features are selected that are found to have the greatest correlation with an accurate output when the CNN is fed a sample image.

A feature of a feature map may, for example, be automatically selected as a function of its degree of mathematical similarity to mathematical representations of expected image structures, or the feature map may be manually chosen by a human operator during the pretraining procedure as a function of the feature map's visual similarity or deemed relevance to a known structure of the image. Other considerations that may be relevant when choosing a feature map include image resolution, resource constraints, or performance requirements.

In step 325, the processor in a similar manner generates a second learned "conv2" feature vector that represents a feature map produced by the CNN's second convolution layer. As with the conv1 feature vector, selection of this second feature map may be performed by any means known in the art. In addition, the conv2 vector, like the conv1 vector, will generally be smaller than the vectors that had served as input to layer 2.

In step 330, the processor harvests a third learned feature vector, by similar means, as an "FC" feature vector that represents a feature map, or a subset of a feature map identified during the CNN pretraining procedure, output by the CNN's first fully connected layer. As with the pixel-intensity feature vectors, some embodiments of the present invention may comprise a different number of learned feature vectors culled from outputs of internal layers of one or more pretrained CNNs.

The resolution or size of each of the three CNN feature maps or of the learned feature vectors may be reduced if necessary to improve performance or reduce resource consumption. In a typical embodiment, if the input image is downsized to a resolution of 224×224 before being fed to convolutional layer 1, the conv1 output may be resized by that layer to 109×109 pixels, producing a feature vector or feature group containing 11,881 (109×109) values. Similarly, layer 2's conv2 output may be sparser yet, reducing the output of layer 1 to a 26×26 feature map and a feature vector comprising 676 (26×26) values. In such a case, the sixth feature vector, produced as a function of the summary operations defined by the first fully connected layer, might then comprise 4.096 (64×64) values.

The exact choice of these resolutions is not an essential feature of the present invention. They instead are implementation-dependent details that may be determined by a designer's expert knowledge of a particular embodiment, and that may be implemented by a person skilled in the art of convolutional neural networking.

At the completion of step 330, embodiments of the present invention will have generated a set of feature vectors (in the running example, three pixel-intensity feature vectors and three learned feature vectors) from the input image, each of which represents a different feature group of the input image. Three of those vectors will have been generated by empirical methods known in the art, and three will have been harvested from intermediate results produced by layers of the pretrained special-purpose CNN. Each of these feature vectors is generated by a different methodology and each comprises a different characterization of features comprised by the input image.

In step 335, the pixel-intensity and learned feature vectors are input into a linear support vector machine (SVM) by means known to those skilled in the art. As is known in the art, an SVM is a type of computerized or mathematical model used in fields like machine learning to analyze data used for applications like classification (determining how to categorize a new input) and linear-regression analysis. An SVM model represents input data elements as points organized into categorized subsets of a two-dimensional space. Each category is represented as a contiguous region of two-dimensional space that does not intersect with any other category region. The locations of these points are optimized by the SVM such that each category is separated from other categories by as large a gap as possible, thus providing a greatest distinction among the categories.

In the running example, known methods of SVM modeling are used to map each of six feature vectors into one of nine possible SVM categories. Two feature vectors may be mapped into a same category, but no vector may be mapped into more than one category.

In some embodiments, this SVM may have been pretrained in a manner similar to that by which the method FIG. 2 pretrained the CNN. In the above example, at the outset of step 335, a nine-category SVM would been pretrained to automatically associate each feature vector with one of the nine previously enumerated semantic categories of cardiac CT scans. In this way, each feature vector would be associated with one of nine possible classifications that may be used to label the input image.

At the conclusion of step 335, the SVM model will have identified six candidate labels for the input image, each of which identifies a classification as a function of one of the six feature vectors generated in steps 305-330. In examples and embodiments described in this document, each label may be represented as a value within the inclusive range of 0 through 9. In embodiments that comprise a different number of semantic categories, the upper boundary of this inclusive range (and the number of categories comprised by the SVM) may be set to the number of categories specific to that embodiment.

In step 340, the six candidate classifications are combined by means known in the art to generate a single most likely label for the input image.

In embodiments described here, that method may comprise a standard linear-regression analysis, as is known in the art. If, for example, L[HoG], L[LBP], L[Haar], L[conv1], L[conv2], and L[FC] each respectively represent one of six labels associated by the SVM in step 340 with one of six feature vectors, a single label LAB for the input image may be derived by means of a linear derived using a known method of linear-regression analysis:

$$LAB = \frac{(a_1 * L[HoG] + a_2 * L[LBP] + a_3 * L[Haar] + a_4 * L[conv1] + a_5 * L[conv2] + a_6 * L[FC])}{\sum_1^6 a_k}$$

Here, coefficients $a_1 \ldots a_6$ may have been previously determined by means of a pretraining procedure similar to the method of FIG. 2 that was used to pretrain the CNN. In one example of such a pretraining procedure, the coefficients may have been determined by maximizing a number of training images m for which $|LAB_m - L_m| < 1$ where $LAB_m$ is a label determined by performing the method of FIG. 2 on an $m^{th}$ training image and $L_m$ is the known correct label for the $m^{th}$ training image. These training images may in some embodiments be culled from the training data identified in FIG. 2, step 200.

To avoid overfitting, and to also avoid solving a non-convex optimization problem, the coefficients may be limited to a contiguous range of integer values that comprise the numeric representations of the semantic categories. In the running example, which comprises nine semantic categories, the coefficients might be selected from an inclusive range of integer values spanning 0 through 10.

Note that while each semantic category is represented by an integer, an image label $LAB_m$ and $L_m$ may in some embodiments assume a non-integer value that falls partway between adjacent categories. If, for example, an image is found to represent a body position at a depth halfway between that of a semantic category 4 and a semantic category 5, a $LAB_m$ label for that image might be identified as 4.5.

In step 345, the processor reports that the input image is a view of the subject's body in body position identified by semantic category LAB. This label may be used by downstream systems for a variety of purposes, such as allowing an image-editing system to overlay a human-readable label onto the image, or adding label metadata to a digital representation of the image in order to attach semantic meaning to the image.

Figure 4:
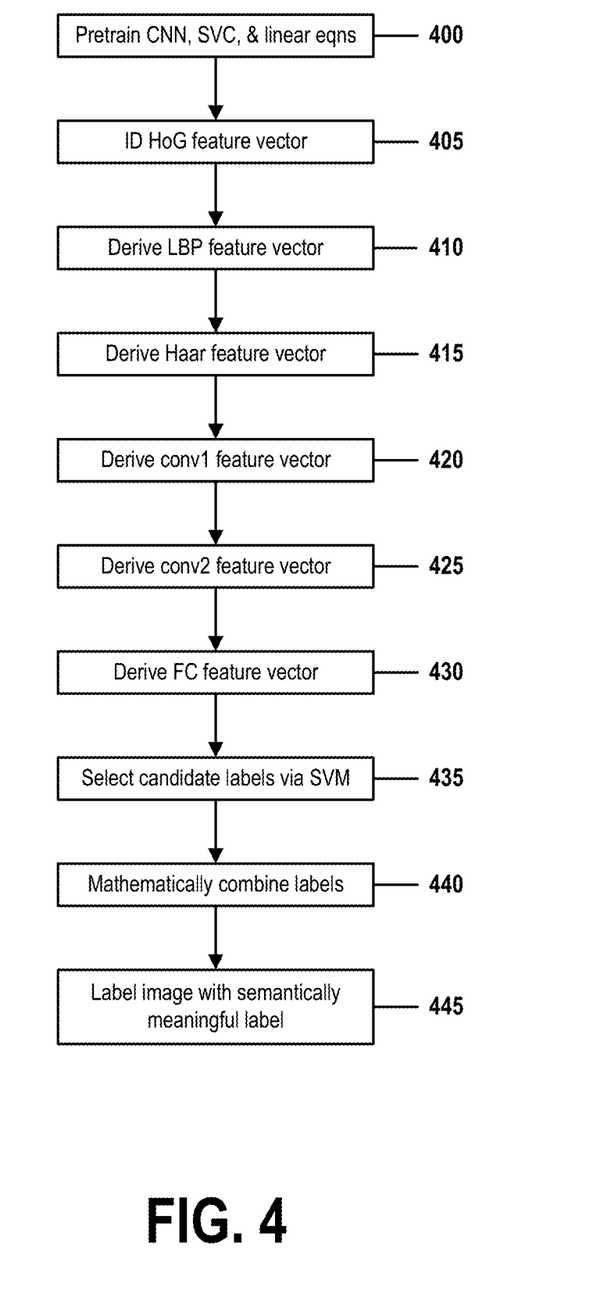
FIG. 4 is a flow chart that illustrates steps of a method for assigning a semantically meaningful label to a digital image in accordance with preferred aspects of the present invention.

FIG. 4 is a flow chart that illustrates steps of a method for assigning a semantically meaningful label to a digital image in accordance with preferred aspects of the present invention. FIG. 4 contains steps 400-445. Step 400 is described in greater detail in FIG. 2.

In step 400, a processor of a computerized image-labeling system pretrains a convolutional neural network (CNN) by means of the method of FIG. 2. This step is similar in function and intent to step 300 of FIG. 3.

At the conclusion of step 400, a convolutional neural network, a support-vector machine, and a linear equation produced by a linear-regression analysis will have been optimized for use by the computerized image-labeling system when performing the remaining steps of FIG. 4. This optimization will have been performed by adjusting parameters of the CNN and SVM and coefficients of a linear equation to accurately assign semantically meaningful labels to training images that depict subject matter similar to that of images expected to be processed by embodiments of the present invention.

In steps 405-430, the processor uses a number of distinct methods, or "classifiers," to each identify a set of characteristics of an input image being processed. Each of these methods produces a feature vector that represents a set of characteristics as an ordered n-tuple. These steps are similar in function and intent to steps 305-330 of FIG. 3.

At least one of these classifiers produces a "pixel-intensity" feature vector as a function of pixel intensities comprised by the digital image. At least one classifier produces a "learned" feature vectors as a function of output of an internal layer of the pretrained CNN. As with the method of FIG. 3, the exact number of pixel-intensity classifiers and the exact number of learned feature vectors are implementation-dependent.

At the completion of step 430, embodiments of the present invention will have generated two sets of feature vectors from the input image, each of which represents a set of image features derived from either pixel intensities of the image or from output of an internal layer of the CNN.

In step 435, the feature vectors are input into the pretrained support vector machine (SVM) by means known to those skilled in the art. This step is similar in function and intent to step 335 of FIG. 3.

The SVM, using mathematical methods known in the art, associates a set of candidate image labels, where each candidate label is selected by the SVM as a function of one of the feature vectors. Each candidate label is a semantically meaningful label that identifies the subject matter of the digital image as a function of contents of a corresponding feature vector.

In step 440, the six candidate classifications are mathematically combined to generate a single most likely semantically meaningful label for the input image. This step is similar in function and intent to step 340 of FIG. 3.

In step 445, the processor labels the digital image by any means known in the art by associating the image with the single most likely semantically meaningful label. This labeling may be performed, for example, by saving the image as a computer file that conforms to a particular naming convention, by associating semantically meaningful metadata with the image, by transmitting it via a computer network in a particular manner, or by storing it in a particular location, such as in a certain table of a database.

This label may, when used in applications that process scans produced by medical-imaging systems, identify particular anatomical structures or a particular viewing position or orientation of subject matter depicted by the image. Because this label has semantic meaning, it may be used by downstream systems for a variety of purposes, such as allowing an image-editing system to overlay a human-readable label onto the image, or adding metadata to a digital representation of the image in order to allow an artificially intelligent image-processing system to infer a meaning of the image.

What is claimed is:

1. A method for inferring body position in a medical-imaging scan, the method comprising:
    accessing a two-dimensional digital image generated by a medical-imaging device, wherein the image represents a cross-sectional view of a subject's body at a position along an axis of the subject's body;
    deriving from the accessed image a set of pixel-intensity feature vectors and a set of learned feature vectors,
        wherein each of the pixel-intensity feature vectors and each of the learned feature vectors is an n-tuple that represents characteristics of the accessed image as an ordered list of numbers,
        wherein the set of pixel-intensity feature vectors comprises at least one vector that represents characteristics of the accessed image derived from relationships among intensities of pixels of the accessed image,
        wherein the set of learned feature vectors comprises at least one vector that represents characteristics of the accessed image selected from output of an internal layer of a convolutional neural network, and
        wherein a first layer of the convolutional neural network has been populated with a digital representation of the accessed image;
    submitting the set of pixel-intensity feature vectors and the set of learned feature vectors to a support-vector machine;
    receiving from the support-vector machine a candidate image label for each submitted feature vector, wherein each candidate image label identifies a position of the subject's body along the axis; and
    generating a single image label of the accessed image by mathematically combining the received candidate image labels,
        wherein the mathematically combining comprises solving a linear equation, and wherein the linear equation comprises regression coefficients selected as a function of a pretraining of the convolutional neural network and further as a function of a pretraining of the support-vector machine.

2. The method of claim 1, wherein the set of pixel-intensity feature vectors comprises a feature vector that represents a histogram of oriented gradients derived from the accessed image.

3. The method of claim 1, wherein the set of pixel-intensity feature vectors comprises a feature vector that represents a set of local binary patterns derived from the accessed image.

4. The method of claim 1, wherein the set of pixel-intensity feature vectors comprises a feature vector that represents a set of Haar-like features derived from the accessed image.

5. The method of claim 1, wherein the set of learned feature vectors comprises a feature vector that represents characteristics of the accessed image selected from output of a first convolutional layer of the convolutional neural network.

6. The method of claim 1, wherein the set of learned feature vectors comprises a feature vector that represents characteristics of the accessed image selected from output of a second convolutional layer of the convolutional neural network.

7. The method of claim 1, wherein the set of learned feature vectors comprises a feature vector that represents characteristics of the accessed image selected from output of a first fully connected layer of the convolutional neural network.

8. The method of claim 1, wherein the convolutional neural network has been pretrained by populating a first layer of the convolutional neural network with digital representations of two-dimensional images, wherein each digital representation represents a cross-sectional view of a human torso viewed from one of a plurality of body positions perpendicular to a major axis of the torso.

9. The method of claim 1, wherein the support-vector machine has been pretrained by submitting to the support-vector machine sets of feature vectors derived from two-dimensional images that each represents a cross-sectional view of a human torso viewed from one of a plurality of body positions perpendicular to a major axis of the torso.

10. The method of claim 1, wherein the single image label is selected from an ordered set of semantically meaningful labels, and wherein the order of the ordered set matches the order of corresponding cross-sectional views of the subject's body at positions along the axis.

11. The method of claim 10, wherein the semantically meaningful labels are ordered in the following sequence:
   a thoracic inlet region,
   a lung apex,
   an origin of great vessels,
   an aortic arch,
   an ascending/descending aorta,
   a pulmonary trunk,
   an aortic valve/aortic root,
   an axial 4-chamber view, and
   a long axis 2-chamber view.

12. The method of claim 10, wherein the ordered set of semantically meaningful labels consists of a monotonically increasing set of integer values.

13. The method of claim 1, wherein the medical-imaging device is a computerized tomography scanner.

14. A method for inferring body position in a CT scan, the method comprising:
   accessing a two-dimensional digital image generated by a medical-imaging device, where the image represents a cross-sectional view of a human torso viewed from a body position perpendicular to a major axis of the subject's body;
   deriving from the accessed image:
      a histogram of oriented gradients represented as a first feature vector,
      a set of local binary patterns represented as a second feature vector,
      a set of Haar-like features represented as a third feature vector,
      a first feature map, represented as a fourth feature vector derived from output of a first convolution layer of a convolutional neural network,
      a second feature map, represented as a fifth feature vector derived from output of a second convolution layer of the convolutional neural network, and
      a third feature map, represented as a sixth feature vector derived from output of a first fully connected layer of the convolutional neural network;
   submitting the six derived feature vectors to a pretrained support-vector machine;
   receiving from the support-vector machine a candidate image label for each submitted feature vector; and
   generating a single image label of the accessed image by mathematically combining the received candidate image labels,
      wherein the mathematically combining comprises solving a linear equation, and wherein the linear equation comprises regression coefficients selected as a function of a pretraining of the convolutional neural network and further as a function of a pretraining of the support-vector machine.

15. The method of claim 14,
   wherein the convolutional neural network has been pretrained by populating a first layer of the convolutional neural network with digital representations of two-dimensional images, wherein each digital representation represents a cross-sectional view of a human torso viewed from one of a plurality of body positions perpendicular to the major axis, and
   wherein the support-vector machine has been pretrained by submitting to the support-vector machine sets of feature vectors derived from two-dimensional images that each represent a cross-sectional view of a human torso viewed from one of a plurality of body positions perpendicular to the major axis.

16. The method of claim 14,
   wherein the single image label is selected from a sequentially ordered group of semantically meaningful labels, and
   wherein a numerical order of the sequentially ordered labels corresponds to relative positions of the ordered labels along the axis.

17. The method of claim 16,
   wherein the group of sequentially ordered group of semantically meaningful labels consists of a monotonically increasing set of integer values that corresponds to the sequential order of the group of labels.

18. The method of claim 16,
   wherein the sequentially ordered group of semantically meaningful labels identifies the following sequentially ordered set of body positions:
   a thoracic inlet region,
   a lung apex,
   an origin of great vessels,
   an aortic arch,
   an ascending/descending aorta,
   a pulmonary trunk,
   an aortic valve/aortic root,
   an axial 4-chamber view, and
   a long axis 2-chamber view.

19. The method of claim 14, wherein the medical-imaging device is a computerized tomography scanner.

20. A computer program product, comprising a computer-readable hardware storage device having a computer-readable program code stored therein, the program code configured to be executed by an image-identification system comprising a processor, a memory coupled to the processor, and an interface mechanism coupled to the processor for receiving a scanned image from a computer-tomography medical-imaging device, where the program code is configured to be run by the processor via the memory to implement a method for inferring body position in a CT scan, the method comprising:
   accessing a two-dimensional digital image generated by a medical-imaging device, where the image represents a cross-sectional view of a human torso viewed from a body position perpendicular to a major axis of the subject's body;
   deriving from the accessed image:
      a histogram of oriented gradients represented as a first feature vector,
      a set of local binary patterns represented as a second feature vector,
      a set of Haar-like features represented as a third feature vector,
      a first feature map, represented as a fourth feature vector derived from output of a first convolution layer of a convolutional neural network,
      a second feature map, represented as a fifth feature vector derived from output of a second convolution layer of the convolutional neural network, and a third feature map, represented as a sixth feature vector derived from output of a first fully connected layer of the convolutional neural network;

submitting the six derived feature vectors to a pretrained support-vector machine;

receiving from the support-vector machine a candidate image label for each submitted feature vector; and generating a single image label of the accessed image by mathematically combining the received candidate image labels, wherein the mathematically combining comprises solving a linear equation, and wherein the linear equation comprises regression coefficients selected as a function of a pretraining of the convolutional neural network and further as a function of a pretraining of the support-vector machine.

\* \* \* \* \*